UNITED STATES PATENT OFFICE.

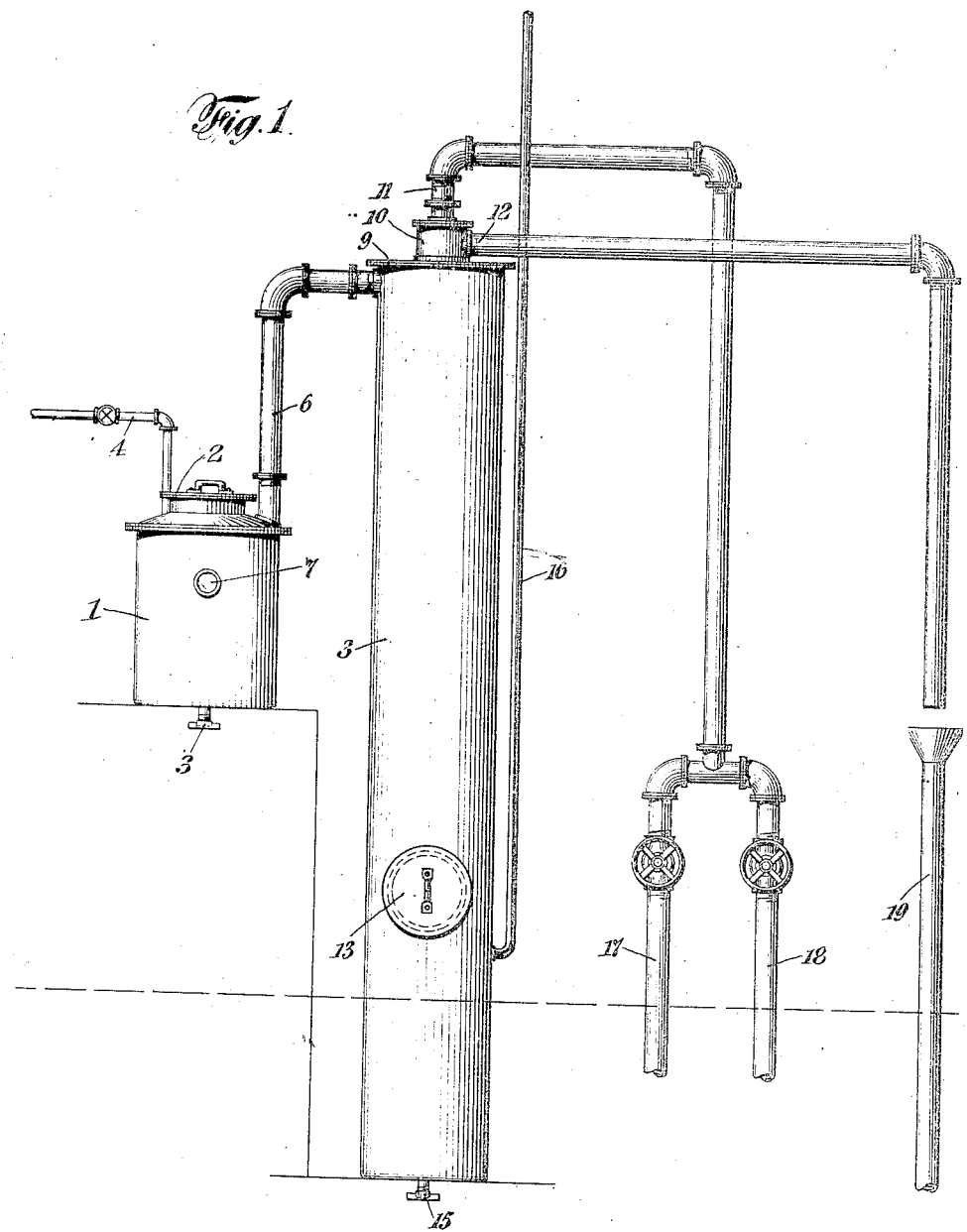

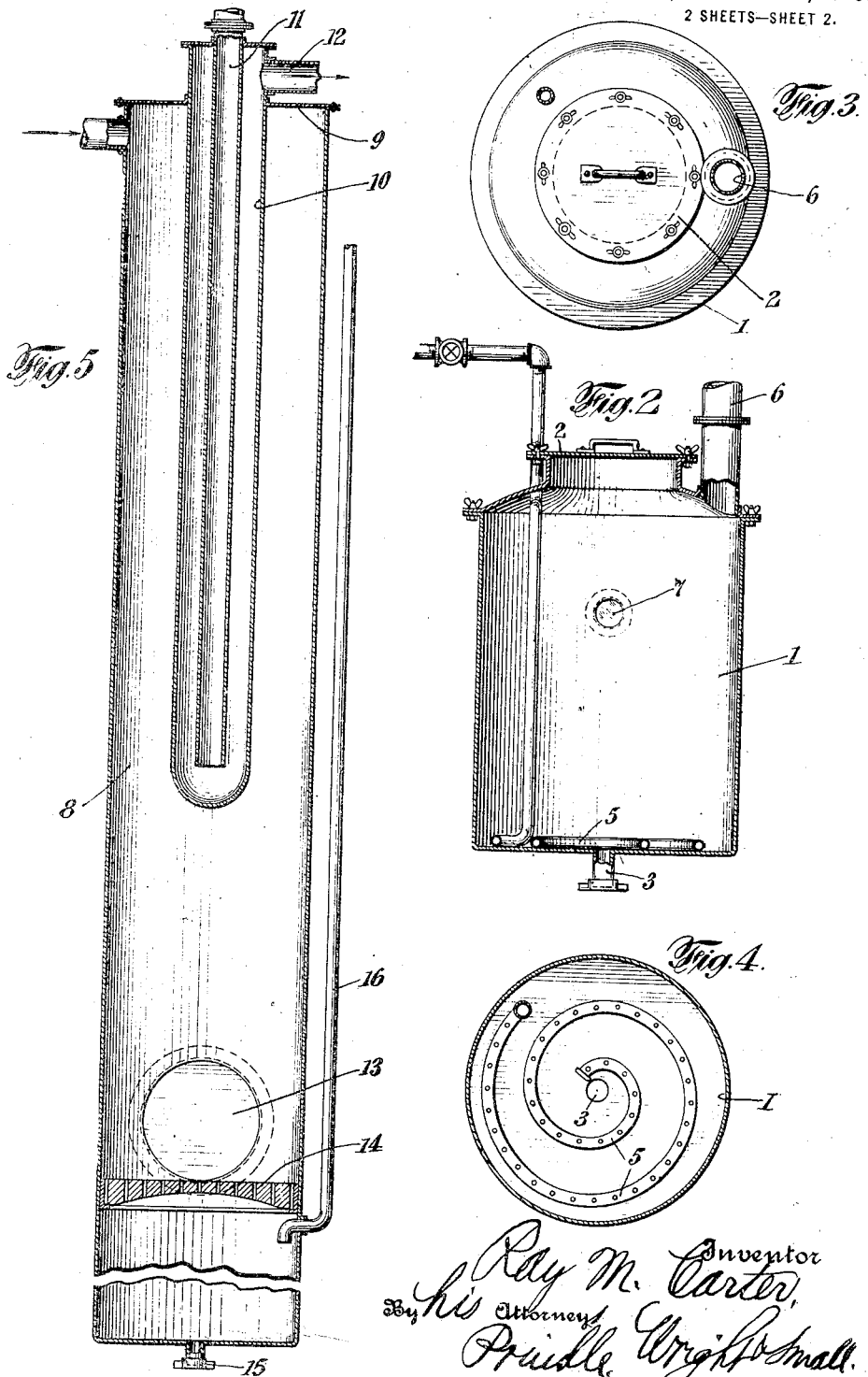

RAY M. CARTER, OF BALTIMORE, MARYLAND, ASSIGNOR TO U. S. INDUSTRIAL ALCOHOL CO., A CORPORATION OF WEST VIRGINIA.

PROCESS OF PURIFYING IODIN.

1,324,761. Specification of Letters Patent. Patented Dec. 9, 1919.

Application filed December 24, 1918. Serial No. 268,163.

*To all whom it may concern:*

Be it known that I, RAY M. CARTER, of Baltimore, in the State of Maryland, have invented a certain new and useful Improvement in Processes of Purifying Iodin, and do hereby declare that the following is a full, clear, and exact description thereof.

My invention relates particularly to a process of purifying iodin in such a manner as to remove the impurities which are ordinarily present in the commercial product.

The object of my invention is to provide a process by means of which iodin may be purified, and particularly in such a manner as to remove the iron and other halogens present therein. Iron is present in commercial iodin as iron iodid, and other halogens, that is chlorin and bromin, are present as iodin chlorid and iodin bromid. All of these compounds pass over with iodin when it is sublimated, in the usual process that is used for the purification of iodin. It is my object to provide a process by means of which iodin can be purified and in such a manner as to remove these impurities.

Further objects of my invention will appear from the detailed description thereof contained hereinafter.

While my invention is capable of being carried out in many different ways, for the purpose of illustration I shall describe only certain ways of carrying out the same hereinafter; and while it is capable of being carried out in connection with many different types of apparatus, I have shown only one type of apparatus for use in connection therewith in the accompanying drawings, in which—

Figure 1 is a side elevation of an apparatus which may be used in connection with my invention;

Fig. 2 is a vertical section through the vaporizing kettle;

Fig. 3 is a plan view of the same;

Fig. 4 is a horizontal section through the same; and

Fig. 5 is a vertical section through the condenser.

In the drawings, I have shown a vaporizing kettle 1, having a removable cover 2 and a drain pipe 3. In the top of the kettle there is, furthermore, provided a valved inlet pipe 4 for introducing a heated gas or vapor, such as steam, by means of a perforated coil 5 located at the bottom of the kettle, and an outlet pipe 6 to allow the vapors of iodin, as well as the heated gas or vapor, to pass out from the kettle 1. The kettle is, furthermore, provided with a window 7, so that the contents may be viewed from time to time.

Into the kettle 1 I introduce 200 pounds of commercial iodin, which will contain impurities, such for example as iron iodid, iodin chlorid and iodin bromid. I then introduce into the kettle a solution of potassium iodid containing 10 pounds of potassium iodid and 100 pounds of a solvent, such for example as water. The heated gas or vapor, such for example as steam, together with the vaporized iodin, now pass out of the kettle 1 by means of the pipe 6. The steam decomposes the iron iodid in the kettle 1, particularly in the presence of the potassium iodid, so that the iodin is liberated therefrom and is driven off, therefore, with the gaseous heating medium. The iodin chlorid and iodin bromid are, furthermore, decomposed by the steam, especially in the presence of the potassium iodid, so as to form potassium chlorid and potassium bromid, which remain in the kettle 1, while allowing the iodin to pass off therefrom in the form of a vapor. The iodin vapor thus obtained, together with the heated gaseous medium, pass from the pipe 6 into a condenser 8, which may be of glass or other suitable material, and which is provided with a cover plate 9, carrying a cooling chamber 10, provided with an inlet pipe 11 for cooling water and an outlet pipe 12 for the same. Said condenser 8 has in the side thereof a removable door 13 for the removal of the solidified iodin which collects above a perforated plate 14 in the bottom of the condenser 8, where it is filtered from the condensed water, which may be drawn off when desired by means of a draw-off pipe 15 in the bottom of the condenser 8. Below the perforated plate 14 there is a vent pipe 16 entering the condenser 8, so as to exhaust accumulated uncondensed vapors which may occur in the condenser to the outer air. Hot and cold water are supplied to the pipe 11 by means of valved supply pipes 17 and 18, respectively, and a drain pipe 19 conveys the effluent from the pipe 12 to a sewer.

In the operation of my invention, the iodin containing impurities is acted upon by the heated gaseous medium in the kettle 1 in such a manner as to set free the iodin from the iron iodid, the iodin chlorid and iodin bromid, so that substantially the entire quantity of iodin present in the body of iodin treated, whether combined or uncombined, is released and driven off from the kettle 1 and obtained in the form of a solid in the condenser 8, from which the condensed water is filtered off and removed.

Water of the desired temperature, that is to say of any temperature which will condense the iodin without freezing the water, is supplied through the pipe 11, and the effluent is drawn off by the pipe 12.

In case the apparatus is operating in such a manner as to permit iodin vapors to accumulate without condensation in the condenser 8, these vapors are vented to the outer air by means of the pipe 16, so as not to injure the workmen operating the apparatus.

The wet iodin thus removed from the condenser 8 is dried in any suitable container at low temperature, as for example the temperature of the atmosphere, but with the application of a high vacuum, as for example 28 inches of mercury. In this way an iodin is obtained which is freed from the iron and other halogens ordinarily found therein.

It will be understood that, instead of the potassium iodid, I may use sodium iodid, calcium iodid or any soluble iodid, and that, instead of the water, I may use some other solvent of the iodid of the alkali or alkali earth metal utilized.

While I have described my invention above in detail, I wish it to be understood that many changes may be made therein without departing from the spirit of the same.

I claim:

1. The process which comprises subjecting iodin containing as an impurity an iodin compound to the action of a heated gaseous medium so as to liberate the iodin contained in said impurity and vaporize the iodin.

2. The process which comprises subjecting iodin containing as an impurity an iodin compound in the presence of a solution of an iodid of an alkali forming metal to the action of a heated gaseous medium so as to liberate the iodin contained in said impurity and vaporize the iodin.

3. The process which comprises subjecting iodin containing as an impurity an iodin compound to the action of a heated gaseous medium so as to liberate the iodin contained in said impurity and vaporize the iodin and then condensing the iodin.

4. The process which comprises subjecting iodin containing as an impurity an iodin compound in the presence of a solution of an iodid of an alkali forming metal to the action of a heated gaseous medium so as to liberate the iodin contained in said impurity and vaporize the iodin and then condensing the iodin.

5. The process which comprises subjecting iodin containing as an impurity an iodin compound to the action of a heated gaseous medium so as to liberate the iodin contained in said impurity and vaporize the iodin, then condensing the iodin, and then filtering off the remainder of the condensate from the iodin and drying the iodin.

6. The process which comprises subjecting iodin containing as an impurity an iodin compound in the presence of a solution of an iodid of an alkali or alkali earth metal to the action of a heated gaseous medium so as to liberate the iodin contained in said impurity and vaporize the iodin, then condensing the iodin, and then filtering off the iodin from the remainder of the condensate and drying the iodin.

7. The process which comprises subjecting iodin containing as an impurity an iodin compound to the action of a heated gaseous medium so as to liberate the iodin contained in said impurity and vaporize the iodin, then condensing the iodin, and then filtering off the iodin from the remainder of the condensate and drying the iodin at a low temperature and high vacuum.

8. The process which comprises subjecting iodin containing as an impurity an iodin compound in the presence of a solution of an iodid of an alkali forming metal to the action of a heated gaseous medium so as to liberate the iodin contained in said impurity and vaporize the iodin, then condensing the iodin, and then filtering off the iodin from the remainder of the condensate and drying the iodin at a low temperature and high vacuum.

9. The process which comprises subjecting iodin containing as an impurity iron iodid to the action of steam so as to liberate the iodin contained in said impurity and vaporize the iodin.

10. The process which comprises subjecting iodin containing as an impurity iron iodid in the presence of a solution of an iodid of an alkali forming metal in water to the action of steam so as to liberate the iodin contained in said impurity and vaporize the iodin.

11. The process which comprises subjecting iodin containing as an impurity iron iodid to the action of steam so as to liberate the iodin contained in said impurity and vaporize the iodin and then condensing the iodin.

12. The process which comprises subjecting iodin containing as an impurity iron iodid in the presence of a solution of an iodid of an alkali forming metal in water to the action of steam so as to liberate the iodin contained in said impurity and vaporize the iodin and then condensing the iodin.

13. The process which comprises subjecting iodin containing as an impurity iron iodid to the action of steam so as to liberate the iodin contained in said impurity and vaporize the iodin, then condensing the iodin, and then filtering off the iodin from the remainder of the condensate and drying the iodin.

14. The process which comprises subjecting iodin containing as an impurity iron iodid in the presence of a solution of an iodid of an alkali forming metal in water to the action of steam so as to liberate the iodin contained in said impurity and vaporize the iodin, then condensing the iodin, and then filtering off the iodin from the remainder of the condensate and drying the iodin.

15. The process which comprises subjecting iodin containing as an impurity iron iodid to the action of steam so as to liberate the iodin contained in said impurity and vaporize the iodin, then condensing the iodin, and then filtering off the iodin from the remainder of the condensate and drying the iodin at a low temperature and high vacuum.

16. The process which comprises subjecting iodin containing as an impurity iron iodid in the presence of a solution of an iodid of an alkali forming metal in water to the action of steam so as to liberate the iodin contained in said impurity and vaporize the iodin, then condensing the iodin, and then filtering off the iodin from the remainder of the condensate and drying the iodin at a low temperature and high vacuum.

17. The process which comprises subjecting iodin containing as an impurity iron iodid and a compound containing iodin and another halogen to the action of steam so as to liberate the iodin contained in said impurity and vaporize the iodin.

18. The process which comprises subjecting iodin containing as an impurity iron iodid and a compound containing iodin and another halogen in the presence of a solution of an iodid of an alkali forming metal in water to the action of steam so as to liberate the iodin contained in said impurity and vaporize the iodin.

19. The process which comprises subjecting iodin containing as an impurity iron iodid and a compound containing iodin and another halogen to the action of steam so as to liberate the iodin contained in said impurity and vaporize the iodin and then condensing the iodin.

20. The process which comprises subjecting iodin containing as an impurity iron iodid and a compound containing iodin and another halogen in the presence of a solution of an iodid of an alkali forming metal in water to the action of steam so as to liberate the iodin contained in said impurity and vaporize the iodin and then condensing the iodin.

21. The process which comprises subjecting iodin containing as an impurity iron iodid and a compound containing iodin and another halogen to the action of steam so as to liberate the iodin contained in said impurity and vaporize the iodin, then condensing the iodin, and then filtering off the iodin from the remainder of the condensate and drying the iodin.

22. The process which comprises subjecting iodin containing as an impurity iron iodid and a compound containing iodin and another halogen in the presence of a solution of an iodid of an alkali forming metal in water to the action of steam so as to liberate the iodin contained in said impurity and vaporize the iodin, then condensing the iodin, and then filtering off the iodin from the remainder of the condensate and drying the iodin.

23. The process which comprises subjecting iodin containing as an impurity iron iodid and a compound containing iodin and another halogen to the action of steam so as to liberate the iodin contained in said impurity and vaporize the iodin, then condensing the iodin, and then filtering off the iodin from the remainder of the condensate and drying the iodin at a low temperature and high vacuum.

24. The process which comprises subjecting iodin containing as an impurity iron iodid and a compound containing iodin and another halogen in the presence of a solution of an iodid of an alkali forming metal in water to the action of steam so as to liberate the iodin contained in said impurity and vaporize the iodin, then condensing the iodin, and then filtering off the iodin from the remainder of the condensate and drying the iodin at a low temperature and high vacuum.

In testimony that I claim the foregoing I have hereunto set my hand.

RAY M. CARTER.

Witnesses:
ARTHUR A. BACKHAUS,
WILLIAM WATSON.